(12) United States Patent
Channakeshava et al.

(10) Patent No.: US 8,548,444 B2
(45) Date of Patent: Oct. 1, 2013

(54) LINKING A NAME TO A PHONE NUMBER IN A TEXT MESSAGE BASED ON A CONTACT LIST IN A MOBILE DEVICE

(75) Inventors: Girish Mallenahally Channakeshava, Bangalore (IN); Scott D. Cook, Woodside, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/355,253

(22) Filed: Jan. 20, 2012

(65) Prior Publication Data
US 2013/0189961 A1 Jul. 25, 2013

(51) Int. Cl.
*H04M 3/42* (2006.01)
(52) U.S. Cl.
USPC .......... 455/414.1; 455/414.2; 455/414.3; 455/414.4; 455/466; 455/412.1; 455/412.2
(58) Field of Classification Search
USPC ............ 455/414.1–414.4, 466, 412.1–412.2
See application file for complete search history.

(56) References Cited

U.S. PATENT DOCUMENTS

| 2007/0130014 A1* | 6/2007 | Altberg et al. ................. 705/14 |
| 2007/0238487 A1* | 10/2007 | Kuhl et al. .................... 455/566 |
| 2009/0221323 A1* | 9/2009 | Yach ........................ 455/552.1 |
| 2011/0171981 A1* | 7/2011 | Jin .............................. 455/466 |

* cited by examiner

*Primary Examiner* — Meless N Zewdu
*Assistant Examiner* — Michael Nguyen
(74) *Attorney, Agent, or Firm* — Osha Liang LLP

(57) ABSTRACT

A method to initiate a phone call to a contact. The method includes analyzing a text message to identify a first attribute of the contact, and selecting one or more entries from a contact list stored in the mobile device by matching the first attribute of the contact to a portion of each of the one or more entries. The method also includes identifying a second attribute of the contact from the one or more entries based on a first pre-determined criterion, and modifying the text message to generate a displayed text message comprising a modified attribute that is modified from the first attribute based on the second attribute. The method also includes receiving a user selection as a first input indicating a user selected the modified attribute in response to viewing the displayed text message, and initiating the phone call to the contact based on the phone number.

9 Claims, 7 Drawing Sheets

FIG. 3A  Screenshot A of John's mobile device 300a
FIG. 3B  Screenshot B of Mary's mobile device 300b
FIG. 3C  Screenshot C of Mary's mobile device 300c
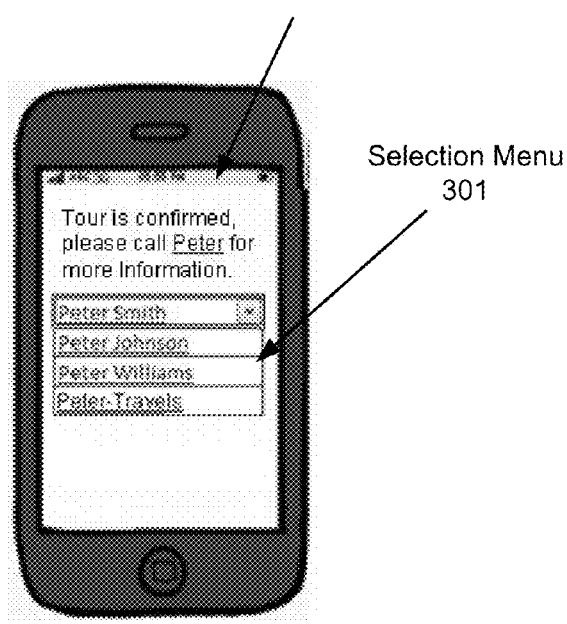
Selection Menu 301
FIG. 3D  Screenshot D of Mary's mobile device 300d

LINKING A NAME TO A PHONE NUMBER IN A TEXT MESSAGE BASED ON A CONTACT LIST IN A MOBILE DEVICE

BACKGROUND

Text messaging, or texting, refers to the exchange of brief written text messages between fixed-line phone or mobile phone and fixed or portable devices over a network. Examples of a text message includes the Short Message Service (SMS) message, multimedia messaging service (MMS) message, TWITTER® (a registered trademark of Twitter, Inc., San Francisco, Calif.) message (referred to as TWEET® (a registered trademark of Twitter, Inc., San Francisco, Calif.)), etc.

Hypertext is text displayed on a computer or other electronic device with references (hyperlinks) to other presentation content (e.g., text, table, image, etc.) that the reader can immediately access, usually by a mouse click or key press sequence. Apart from running text, hypertext may contain tables, images and other presentational devices.

A texter (i.e., a sender of a text message) often inserts a contact's name (e.g., the name of a person or other entity) in the SMS and asks the recipient of the text message to call this person or entity. For example, a SMS may read "Tour is confirmed, call Peter for more details." Upon reading this SMS, the recipient has to take additional effort to remember the contact named "Peter" and find him in the contact list to call for the tour details. This required effort sometimes prevents the recipient from following the instruction of the SMS to make call.

SUMMARY

In general, in one aspect, the invention relates to a method to initiate a phone call to a contact. The method includes analyzing, using a computer processor of a mobile device, a text message received by the mobile device to identify a first attribute of the contact included in the text message. The method further includes selecting one or more entries from a contact list stored in the mobile device by matching the first attribute of the contact to a portion of each of the one or more entries, wherein the contact list comprises contact names and contact phone numbers of acquaintances of a user of the mobile device. The method also includes identifying a second attribute of the contact from the one or more entries based on a first pre-determined criterion, wherein the first attribute and the second attribute combined provide a name and a phone number of the contact. The method further includes modifying, using the computer processor, the text message to generate a displayed text message comprising a modified attribute that is modified from the first attribute based on the second attribute. The method also includes receiving a user selection as a first input indicating a user selected the modified attribute in response to viewing the displayed text message, and initiating, using the mobile device, the phone call to the contact based on the phone number and in response to receiving the first input.

In general, in one aspect, the invention relates to a method to initiate a phone call to a contact The method includes sending, from a computer server to a mobile device, a name and a phone number of the contact to be stored in a contact list of the mobile device, wherein the contact list comprises contact names and contact phone numbers of acquaintances of a user of the mobile device. The method further includes receiving, by the computer server from the mobile device, a confirmation indicating that the name and the phone number is included in the contact list and sending, from the computer server and in response to receiving the confirmation, a text message comprising the name of the contact and instructing the user to initiate a phone call to the contact. Initiating a phone call to the contact includes analyzing, using a computer processor of the mobile device, the text message to identify the name included in the text message and selecting one or more entries from the contact list by matching the name to a portion of each of the one or more entries. Initiating the phone call to the contact also includes identifying the phone number of the contact from the one or more entries based on a first pre-determined criterion and modifying, using the computer processor, the text message to generate a displayed text message comprising a hypertext comprising the name and linking to the phone number via a hyperlink stored in the mobile device. Initiating the phone call to the contact further includes receiving an input indicating the user clicking the hypertext in response to viewing the displayed text message, and initiating, using the mobile device based on the phone number and in response to receiving the input, the phone call to the contact.

In general, in one aspect, the invention relates to a method to initiate a first message to a contact in a contact list stored in a mobile device. The method includes analyzing, using a computer processor of a mobile device, a second message received by the mobile device to identify, within the second message, a first attribute of the contact, and selecting one or more entries from the contact list by matching the first attribute of the contact to a portion of each of the one or more entries, wherein the contact list stores contact names and contact information items of a user of the mobile device. The method further includes identifying a second attribute of the contact from the one or more entries based on a first pre-determined criterion, wherein the first attribute and the second attribute combined provide a name and a contact information item of the contact and modifying, using the computer processor, the second message to generate a displayed message comprising a modified attribute that is modified from the first attribute based on the second attribute. The method further includes receiving an input indicating a user selecting the modified attribute in response to viewing the displayed message, and initiating, using the mobile device based on the contact information item and in response to receiving the input, the first message to be sent to the contact.

In general, in one aspect, the invention relates to a mobile device to initiate a phone call to a contact, The mobile device includes a processor and a text message analyzer executing on the processor and configured to analyze a text message received by the mobile device to identify a first attribute of the contact included in the text message. The mobile device also includes a contact list analyzer executing on the processor and configured to select one or more entries from a contact list by matching the first attribute of the contact to a portion of each of the one or more entries, wherein the contact list stores contact names and contact phone numbers of acquaintances of a user of the mobile device. The contact list analyzer is further configured to identify a second attribute of the contact from the one or more entries based on a first pre-determined criterion, wherein the first attribute and the second attribute comprise a name and a phone number of the contact. The mobile device further includes a user module executing on the processor and configured to generate a displayed text message comprising a modified attribute that is modified from the first attribute based on the second attribute and receive a first input indicating a user clicking the modified attribute in response to viewing the displayed text message. The user module is further configured to initiate, based on the phone number and in response to receiving the first input, the phone call to the contact. The mobile device further includes a display device configured to present the displayed text message to the user, and a repository configured to store the contact list.

In general, in one aspect, the invention relates to a non-transitory computer readable medium storing instructions to initiate a phone call to a contact, the instructions when executed by a computer processor of a mobile device comprising functionality to analyze a text message received by the mobile device to identify a first attribute of the contact included in the text message and select one or more entries from a contact list stored in the mobile device by matching the first attribute of the contact to a portion of each of the one or more entries, wherein the contact list comprises contact names and contact phone numbers of acquaintances of a user of the mobile device. The instructions further include functionality to identify a second attribute of the contact from the one or more entries based on a first pre-determined criterion, wherein the first attribute and the second attribute combined provide a name and a phone number of the contact, and modify the text message to generate a displayed text message comprising a modified attribute that is modified from the first attribute based on the second attribute. The instructions further include functionality to receive a user selection as a first input indicating a user selected the modified attribute in response to viewing the displayed text message, and initiate, using the mobile device, the phone call to the contact based on the phone number and in response to receiving the first input.

In general, in one aspect, the invention relates to a non-transitory computer readable medium storing instructions to initiate a phone call to a contact, the instructions when executed by a processor of a computer server comprising functionality to send, to a mobile device, a name and a phone number of the contact to be stored in a contact list of the mobile device, wherein the contact list comprises contact names and contact phone numbers of acquaintances of a user of the mobile device, and receive, from the mobile device, a confirmation indicating that the name and the phone number is included in the contact list. The instructions further include functionality to send, in response to receiving the confirmation, a text message comprising the name of the contact and instructing the user to initiate a phone call to the contact. Initiating the phone call includes analyzing the text message to identify the name included in the text message, and selecting one or more entries from the contact list by matching the name to a portion of each of the one or more entries. Initiating the phone call further includes identifying the phone number of the contact from the one or more entries based on a first pre-determined criterion, and modifying the text message to generate a displayed text message comprising a hypertext comprising the name and linking to the phone number via a hyperlink stored in the mobile device. Initiating the phone call further includes receiving an input indicating the user clicking the hypertext in response to viewing the displayed text message, and initiating, using the mobile device based on the phone number and in response to receiving the input, the phone call to the contact.

Other aspects of the invention will be apparent from the following detailed description and the appended claims.

BRIEF DESCRIPTION OF DRAWINGS

FIGS. 3A-3H show examples of linking a name to a phone number in a text message based on a contact list in a mobile device in accordance with one or more embodiments of the invention.

DETAILED DESCRIPTION

Figure 1:
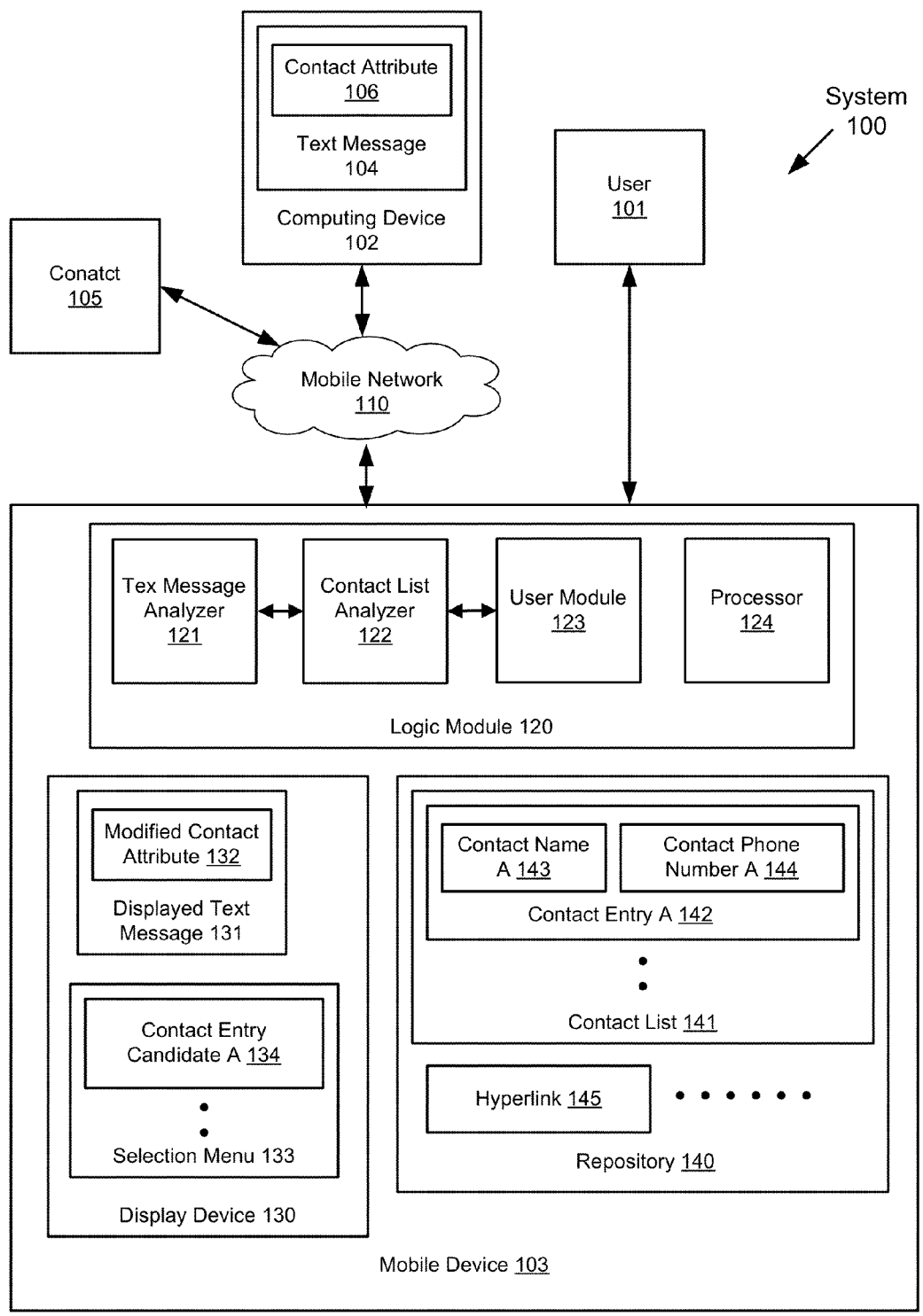
FIG. 1 shows a schematic diagram of a system of linking a name to a phone number in a text message based on a contact list in a mobile device in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provides a convenient mechanism for a text message recipient to call a contact by automatically linking (e.g., via a hypertext link) the name of the contact embedded in the text message to a corresponding phone-number in a contact list stored in the device receiving the text message, and vice versa. When a contact's name in a text message is linked, for automatic conversion, to a relevant phone number in phone's contact list, the additional effort is eliminated for the text message recipient to remember the contact's name in the text message and to look it up in the contact list to make the phone call. When a phone number in a text message is automatically converted, as the text message is being composed by the sender, to a relevant contact's name (typically shorter than the phone number) in phone's contact list, the size (i.e., number of text characters) of the text message is more efficiently used without un-necessarily exceeding a size limitation, such as 140 bytes for SMS or TWEET. Such text message size saving increases as when the text message contains multiple phone numbers.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a social survey system in accordance with embodiments disclosed herein.

As shown in FIG. 1, the system (100) includes computing device (102) and mobile device (103) coupled via mobile network (110). For example, the mobile network (110) may include a cellular phone network, wired and/or wireless portions of the Internet, and/or other data communications networks such as wide area networks (WANs), local area networks (LANs), etc. The computing device (102) may be used by a contact (105) to send text messages (e.g., text message (104) including a contact attribute (106)). For example, the contact attribute (106) may be a name or a phone number of the contact (105), who may be a person or an entity equipped with computing facilities reachable via the mobile network (110). "Contact attribute" may also be abbreviated as "attribute" depending on the context of this disclosure. Further, the mobile device (103) is used by a user (101) to receive text messages (e.g., text message (104) sent from the computing device (102)) and includes logic module (120), display device (130), and repository (140). In addition, the logic module (120) includes processor (124) that is configured to execute text message analyzer (121), contact list analyzer (122), and user module (123). The display device (130) may be used to display text messages (e.g., displayed text message (131) including a modified contact attribute (132)). The display device (130) may be used to display the selection menu (133) for selecting from contact entry candidates (e.g., contact entry candidate A (134)). The repository (140) may be used for storing contact list (141) including contact entries (e.g., contact entry A (142) having a contact name A (143) and a contact phone number A (144)). "Contact entry" may also be abbreviated as "entry" depending on the context of this disclosure. The repository (140) is also configured to store hyperlinks (e.g., hyperlink (145)). In one or more embodiments, the repository (140) is a persistent storage device (or set of devices) and is configured to store data for use by the text message analyzer (121), contact list analyzer (122), and user module (123). The repository (140) (and/or any portion thereof) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof.

In one or more embodiments, the computing device (102) may be any device (e.g., telephone mobile phone, smartphone, tablet computer, notebook computer, desktop computer, server computer, etc.) with computing and data communication resources that is capable of sending text messages, such as the text message (104). In one or more embodiments, the text message (104) may be composed by a texter (e.g., a person or other entity) using the computing device (102) or composed using another device for sending by the computing device (102). As shown, the text message (104) includes the contact attribute (106) of the contact (105). In one or more embodiments, the contact attribute (106) may be a name of the contact (105) or a phone number of the contact (105). For example, the text message (104) may read "Tour is confirmed, call Peter for more details" where the contact attribute (106) is the name Peter of the contact (105). In another example, the text message (104) may read "Tour is confirmed, call 408-727-0600 for more details" where the contact attribute (106) is the phone number 408-727-06500 of the contact (105).

In one or more embodiments, the mobile device (103) may be a cellular phone, a smartphone, a tablet computer, or any other mobile computing device of the user (101). In one or more embodiments, the contact list (141) stored in the mobile device (103) contains contact names and contact phone numbers of acquaintances (e.g., contact (105)) of the user (101). Generally, one or more contact names and one or more contact phone numbers of a single acquaintance (e.g., contact (105)) of the user (101) is stored in one contact entry, such as the contact entry A (142).

In one or more embodiments, the logic module (120) of the mobile device (103) includes the text message analyzer (121) that is configured to analyze a text message (e.g. text message (104)) received by the mobile device (103) to identify an attribute (e.g., contact attribute (106)) of the contact (e.g., contact (105)) included in the received text message (e.g. text message (104)). This attribute is referred to as the identified (contact) attribute or the first (contact) attribute. For example, the identified contact attribute (106) may be extracted from the text message (104) by the text message analyzer (121).

In one or more embodiments, the logic module (120) of the mobile device (103) includes the contact list analyzer (122) that is configured to select one or more entries from the contact list (141) by matching the identified attribute (e.g., contact attribute (106)) of the contact to a portion (e.g., the contact name portion or the contact phone number portion) of each of the one or more entries (e.g., contact entry A (142)). In this context, each contact entry (e.g., contact entry A (142)) of the contact list (141) may be considered a contact entry candidate in this matching/selecting activity.

In one or more embodiments, in the contact list (141), an entry having a contact attribute that matches the identified attribute (e.g., contact attribute (106)) is selected by the contact list analyzer (122). For example, when the contact attribute (106)) is a contact name contained in the text message (104), the contact entry A (142) considered as a contact entry candidate may be matched to the contact attribute (106) based on the contact name A (143) and thereby selected by the contact list analyzer (122). In another example when the contact attribute (106)) is a contact phone number contained in the message (104), the contact entry A (142) considered as a contact phone number candidate may be matched to the contact attribute (106)) based on the contact phone number A (144) and thereby selected by the contact list analyzer (122). Depending on the organization of the contact list (141) and particular algorithm implemented in the contact list analyzer (122) to handle duplicates, a single entry or multiple entries may be selected for any given contact attribute identified/extracted from the received text message.

In one or more embodiments, the contact list analyzer (122) is further configured to identify a separate attribute of the contact (e.g., contact (105)) from the selected contact entry (e.g., contact entry A (142)). This separate attribute is referred to as the additionally identified (contact) attribute or the second (contact) attribute. For example, when the contact attribute (106) is a contact name contained in the text message (104) and is matched to the contact name A (143) of the contact entry A (142) in the contact list (141), the contact list analyzer (122) will additionally identify the contact phone number A (144) of the contact entry A (142). In another example when the contact attribute (106)) is a contact phone number contained in the message (104) and is matched to the contact phone number A (144) of the contact entry A (142) in the contact list (141), the contact list analyzer (122) will additionally identify the contact name A (143) of the contact entry A (142).

In one or more embodiments, the logic module (120) of the mobile device (103) includes the user module (123) that is configured to generate a displayed text message (131) containing a modified contact attribute (132) that is modified from the first attribute (i.e., the identified contact attribute) based on the second attribute (i.e., the additionally identified contact attribute). For example, whether the contact attribute (106) is a contact name or a contact phone number contained in the text message (104) that is matched to the contact entry A (142) in the contact list (141), the user module (123) will replace the contact attribute (106) in the text message (104) by a hypertext version of the contact name A (143) when the text message (104) is displayed and referred to as the displayed text message (131). Said in other words, the displayed text message (131) contains the modified contact attribute (132) that is a hypertext linking to the contact phone number A (144) via a hyperlink (e.g., hyperlink (145)).

In one or more embodiments, the hyperlink (145) links the hypertext to a location storing the contact phone number A (144) in the contact list (141). In one or more embodiments, the hyperlink (145) links the hypertext to a data structure storing a copy of the contact phone number A (144) separately from the contact list (141). In one or more embodiments, such location or data structure may store multiple contact phone numbers if more than one contact list entry have been matched and selected. For example, multiple contact list entries may have been matched and selected due to duplicate entries or overlapping entries in the contact list (141) that contain same contact name (e.g., "Joe" and "Joe Doe" both contains the first name "Joe") but different phone numbers.

In one or more embodiments, the logic module (120) of the mobile device (103) includes the display device (130) that may be a liquid crystal display, a flat panel display, or other suitable type of display that is configured to display the displayed text message (131) and a selection menu (133). Accordingly, the user (101) views the displayed text message (131) and may click the modified contact attribute (132) therein to initiate a phone call to the contact.

In a first scenario where a single contact list entry (e.g., contact list entry A (142)) has been matched to the contact name (i.e., contact attribute (106)) embedded in the text message (104), the user module (123) receives this click input and initiates the phone call using the corresponding contact phone number (i.e., contact phone number A (144)) referenced by the hyperlink (145). In a second scenario where multiple contact list entries (referred to as contact entry candidates) have been matched to the contact name (i.e., contact attribute (106)) embedded in the text message (104), the user module (123) activates the selection menu (133) to be displayed using the display device (130). In one or more embodiments, the selection menu (133) presents multiple contact entry candidates (e.g., contact entry candidate (134), etc.) previously matched and selected by the contact list analyzer (122). As noted above, multiple contact entry candidates may be duplicate entries or overlapping entries in the contact list (141) that contain same contact name (e.g., "Joe" and "Joe Doe" both contains the first name "Joe") but different phone numbers. In the second scenario, the user (101) may select one of the multiple contact entry candidates displayed in the selection menu (133) to call. Accordingly, the user module (123) initiates the call using the corresponding contact phone number contained in the one contact entry candidate selected by the user (101) from the selection menu (133). Specifically, one of the multiple contact phone numbers referenced by the hyperlink (145) is used to initiate the call based on the user selection from the selection menu (133). In one or more embodiments, each of the multiple contact entry candidates in the selection menu (133) is displayed as an individual hypertext linking to a corresponding contact phone number in one of the multiple contact entry candidates.

In another scenario, the aforementioned multiple contact entry candidates may correspond to separate contacts recorded using the same contact name (e.g., same first name, last name, or full name) in the contact list (141) and yet distinguishable based on other information embedded in each of the contact entry candidates. For example, a business name, profession, address, etc. may be used to distinguish among these separate contacts. In one or more embodiments, the contact list analyzer is further configured to compare a context of the text message (104) and this additional information contained in the multiple contact entry candidates to identify the contact to call. For example, the text message (104) may read "call Peter to arrange shuttle service to airport." Accordingly, one of multiple contact list entries containing contact name "Peter" may be selected based on the business name field of the contact list entry containing "Peter's shuttle service" or "South Bay Limousine Service."

In yet another scenario, a surrogate contact list entry may be used allowing computer generated text message to instruct the text message recipient to call a particular phone number for accessing a particular service or activating a particular command. In one or more embodiments, the name and the phone number of a fictitious contact (referred to as a surrogate contact) are received by the contact list analyzer (122) from the computing device (102), which is a computer server instead of a device used by the contact (105). Accordingly, the received surrogate contact name and the surrogate contact phone number are included in a surrogate contact entry (e.g., contact entry A (142)). Further, a hyperlink (e.g., hyperlink (145)) is generated linking the surrogate contact name and the surrogate contact phone number. Upon creating the surrogate contact list entry and configuring the corresponding hyperlink, a confirmation is sent by the contact list analyzer (122) to the computing device (102).

In one or more embodiments, multiple surrogate contact entries in the contact list (141) are set up in this manner and reported back to the computing device (102). Accordingly, the computing device (102) may send the text message (104) containing one or more of such surrogate contact names to instruct the user (101) how to access various services or activate various commands corresponding to the surrogate contact phone numbers associated with these surrogate contact names. For example, the surrogate contact name may be a single digit number to represent a multiple digit surrogate contact phone number thus allowing a large number of surrogate contact phone numbers to be transmitted to the user (101) without exceeding a size limitation of the text message (104). More details of these various scenarios are described in reference to FIGS. 3A-3H below.

Figure 2A:
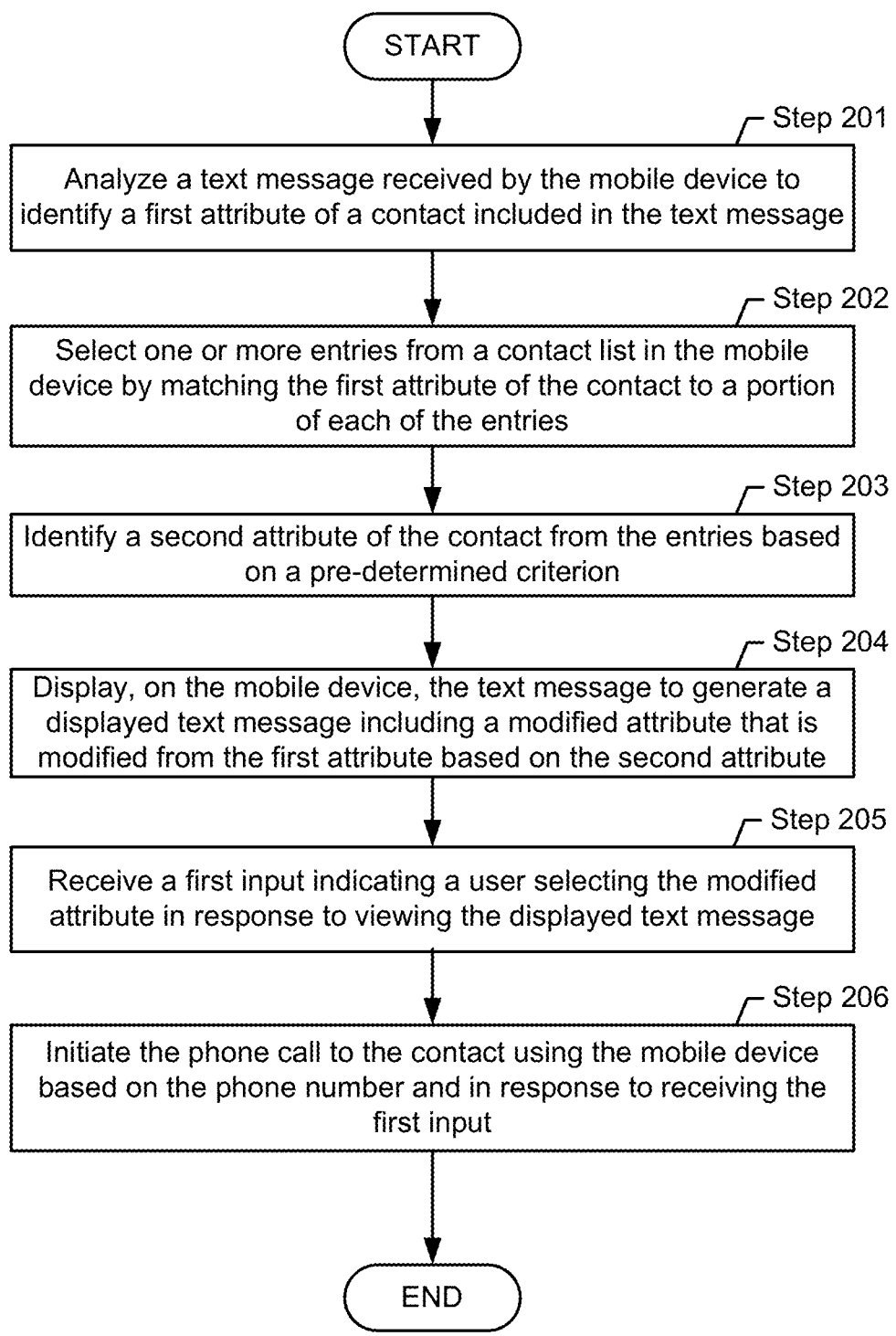
FIGS. 2A and 2B show flowcharts of a method of linking a name to a phone number in a text message based on a contact list in a mobile device in accordance in accordance with one or more embodiments of the invention.

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method described in reference to FIG. 2A may be practiced using the system (100) described in reference to FIG. 1 above.

Initially in Step 201, a text message is received by a mobile device of a user. The text message includes a contact name or a contact phone number that are referred to as a first attribute of a contact. Said in other words, the text message refers to a contact by his/hers name or phone number. For example, the text message may read "call Peter to arrange shuttle service to airport" or "call 408-727-0600 to arrange an appointment."

In Step 202, one or more entries are selected from a contact list in the mobile device by matching the first attribute of the contact to a portion of each of the entries. For example, the matching criterion may be partial matching to a portion of a text string (e.g., first name, second name, full name, phone number with area code, phone without area code, etc.). In another example, the matching criterion may be exact matching of two text strings. In the example where the first attribute is the contact name Peter, one or more contact list entries containing the first name Peter are selected. For example, the contact list entries "Peter, 408-xxx-xxxx, Peter shuttle service, . . . " and "Peter Doe, 415-xxx-xxxx, Doe's florist, . . . " are both selected by matching the first attribute "Peter" to a portion of either of the two contact list entries. In the example where the first attribute is the contact phone number 408-727-0600, a contact list entry containing a matching phone number is selected.

In Step 203, a second attribute of the contact is identified from the selected contact list entries based on a pre-determined criterion. In the example where the first attribute is the contact name, the second attribute is then a corresponding contact phone number. For example, 408-xxx-xxxx is identified as the second attribute for the selected contact list entry "Peter, 408-xxx-xxxx, Peter shuttle service, . . . " and 415-xxx-xxxx is identified as another second attribute for the selected contact list entry "Peter Doe, 415-xxx-xxxx, Doe's florist, . . . " In the example where the first attribute is the contact phone number, the second attribute is then a corresponding contact name.

In Step 204, the received text message is displayed on the mobile device where the first attribute of the referred contact is replaced by a modified attribute that is modified from the first attribute based on the second attribute. In one or more embodiments, the modified attribute is a hypertext linking to additional attributes of the referred contact where the additional attributes are looked up from the contact list. For example, the hypertext is based on the first attribute and the additional attributes include the second attribute linked by a hyperlink of the hypertext. In the example where the first attribute is the contact name "Peter", the modified attribute is then a hypertext version of the contact name "Peter" with a underlying hyperlink linking to the contact list entries "Peter, 408-xxx-xxxx, Peter shuttle service, . . . " and "Peter Doe, 415-xxx-xxxx, Doe's florist, . . . " both containing the contact name "Peter" where respective contact phone numbers can be looked up.

In Step 205, an input is received indicating the user selecting the modified attribute in response to viewing the displayed text message. For example, the user may click the hypertext "Peter" to indicate his/her selection. In one or more embodiments, when multiple contact list entries have been matched to the contact referred to in the text message, a selection menu is displayed in response to receiving user selection of the modified attribute. The selection menu includes these multiple contact list entries requiring further selection from the user. For example, both contact list entries "Peter, 408-xxx-xxxx, Peter shuttle service, . . . " and "Peter Doe, 415-xxx-xxxx, Doe's florist, . . . " are displayed in the selection menu. Accordingly, the user further selects the entry "Peter, 408-xxx-xxxx, Peter shuttle service, . . . " based on the context of the text message "call Peter to arrange shuttle service to airport" as understood by the user. In one or more embodiments, the context of these two contact list entries are compared to the context of the text message using a computer algorithm to automatically select the entry "Peter, 408-xxx-xxxx, Peter shuttle service, . . . " without displaying the selection menu thus eliminating the need for further user intervention.

In Step 206, the phone call is initiated to the selected contact. For example, the contact named Peter is called by entering the phone number 408-xxx-xxxx into a mobile device, such as a smartphone, and pressing a button or image (e.g., connect, call, etc.) to initiate the call.

More details of actual application of the method depicted in FIG. 2A are described in reference to the examples shown in FIGS. 3A-3F below.

Figure 2B:
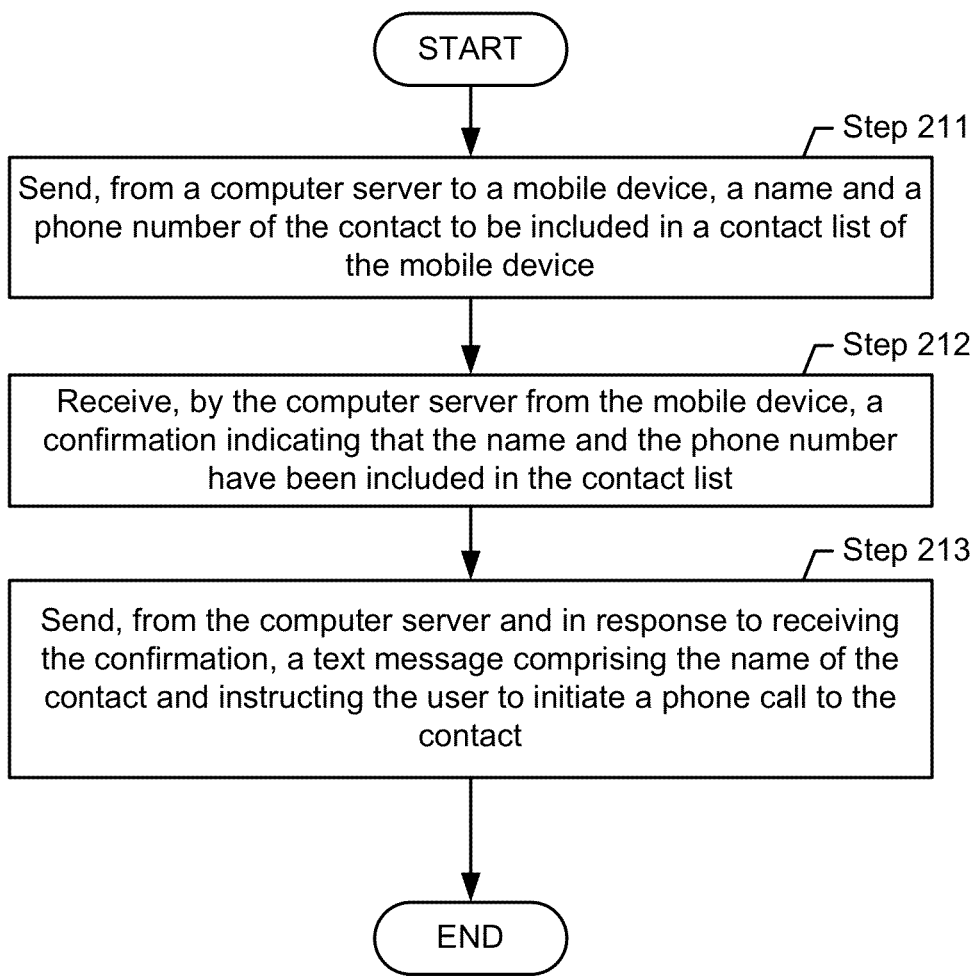

FIG. 2B depicts a flowchart of a method in accordance with one or more embodiments of the invention. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method described in reference to FIG. 2A may be practiced using the system (100) described in reference to FIG. 1 above.

Initially in Step 211, a surrogate contact name and a surrogate contact phone number of a surrogate contact is sent from a computer server to a mobile device to be included in a contact list of the mobile device. The surrogate contact is a fictitious contact that is not a person or any physical entity. Rather, the surrogate contact is merely a place holder in the contact list where the surrogate contact name is merely a short hand symbol to access a corresponding phone number stored in the contact list after it is received by the mobile device. For example, the surrogate contact name may be "1" and the surrogate phone number may be a number for accessing a particular service via calling. In one or more embodiments, multiple surrogate contacts are stored in the contact list.

In Step 212, the computer server receives a confirmation from the mobile device indicating that the surrogate contact name and the surrogate contact phone number have been included in the contact list and that a hyperlink has been established or is ready to be established to link a hypertext version of the surrogate name to the surrogate contact phone number.

In Step 213, in response to receiving the confirmation, the computer server sends a text message instruction to the mobile device instructing the user to call the surrogate contact, which is referred to by the surrogate contact name in the text message. For example, the text message may read "Call 1 to hear a recording of your phone bill balance." In this example, "1" is the surrogate contact name and the corresponding surrogate contact phone number is the phone number, possibly concatenated with a phone extension or other IVR (interactive voice response) sequence, to call for a recording of the phone bill balance to be played back to the caller once the caller is authenticated. In one or more embodiments, multiple surrogate contact names are embedded in the text message for a multiple choice selection menu. For example, the text message may read "Call A to hear top news story, call B to hear business news, call C to hear sport news, call D to hear entertainment news." When the items in the selection menu increases, the text message may be further abbreviated to keep the text message size within a limitation, such as 140 bytes for SMS.

More details of actual application of the method depicted in FIG. 2B are described in reference to the example shown in FIGS. 3G and 3H below.

FIGS. 3A-3H show application examples in accordance with one or more embodiments of the invention. This example application may be practiced using the system (100) of FIG. 1 and based on the method described with respect to FIGS. 2A and 2B above.

FIG. 3A shows screenshot A (300*a*) of a texter John's mobile device when John is composing a text message to be sent. As shown, the screenshot A (300*a*) includes the composed text message displayed on John's mobile device that reads "Tour is confirmed, please call Peter for more information."

FIG. 3B shows screenshot B (300*b*) of Mary's mobile device displaying the text message sent from John. Mary's mobile device is installed with a software application executing the method depicted in FIG. 2A that has converted the contact name "Peter" into a hypertext version. Once Mary click on the hypertext version of the contact name "Peter" in the displayed text message that now reads "Tour is confirmed, please call Peter for more information," Mary's mobile device will follow the hyperlink to access Peter's phone number in the contact list of Mary's mobile device and place the call to Peter. If there are more than one contact list entry matching the contact name "Peter," Mary's mobile device will display all the matching contact names in a selection menu as shown in FIG. 3C as screenshot C (300c) of Mary's mobile device.

As shown in FIG. 3C, the selection menu (301) allows Mary to choose one of four hypertext entries containing the first name Peter. Once Mary makes a selection by clicking on the selected hypertext, her mobile device will follow the underlying hyperlink to access the selected contact phone number and place the call.

FIG. 3D shows another scenario where the software application installed on Mary's mobile device has the additional machine intelligence to identify one particular contact list entry out of the four that contains the contact name "Peter." In particular, the software application is able to match the key word "tour" in the text message with the keyword "travels" in the particular contact list entry "Peter-Travels" based on context matching. Such context matching may be based on various different fields in the contact list entry, such as name, nickname, business name, residence address, office address, web address, note, category, etc.

Figure 3F:
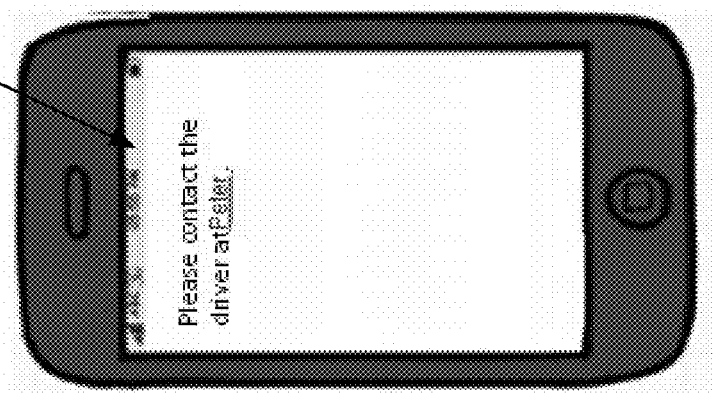
Figure 3E:
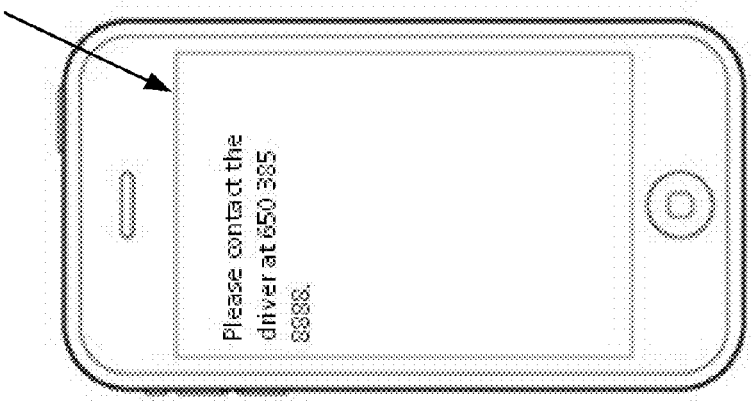

FIG. 3E shows screenshot E (300e) of a texter John's mobile device when John is composing a text message to be sent. As shown, the screenshot E (300e) includes the composed text message displayed on John's mobile device that reads "Please contact the driver at 650 385 8888."

In response, FIG. 3F shows screenshot F (300f) of Mary's mobile device displaying the text message sent from John. Mary's mobile device is installed with a software application executing the method depicted in FIG. 2A that has converted the contact phone number "650 385 8888" into a hypertext version of a corresponding contact name "Peter." This converted text message is displayed to Mary as "Please contact the driver at Peter." Because Mary may not remember who the contact is by seeing just the contact phone number, with the converted text message Mary now has more context regarding the intended message sent from John compared to displaying the original message. Once Mary clicks on the hypertext version of the contact name "Peter," Mary's mobile device will follow the hyperlink to access Peter's phone number "650 385 8888," either in the contact list of Mary's mobile device or some other working data storage location and place the call to Peter.

Figures 3G, 3H:
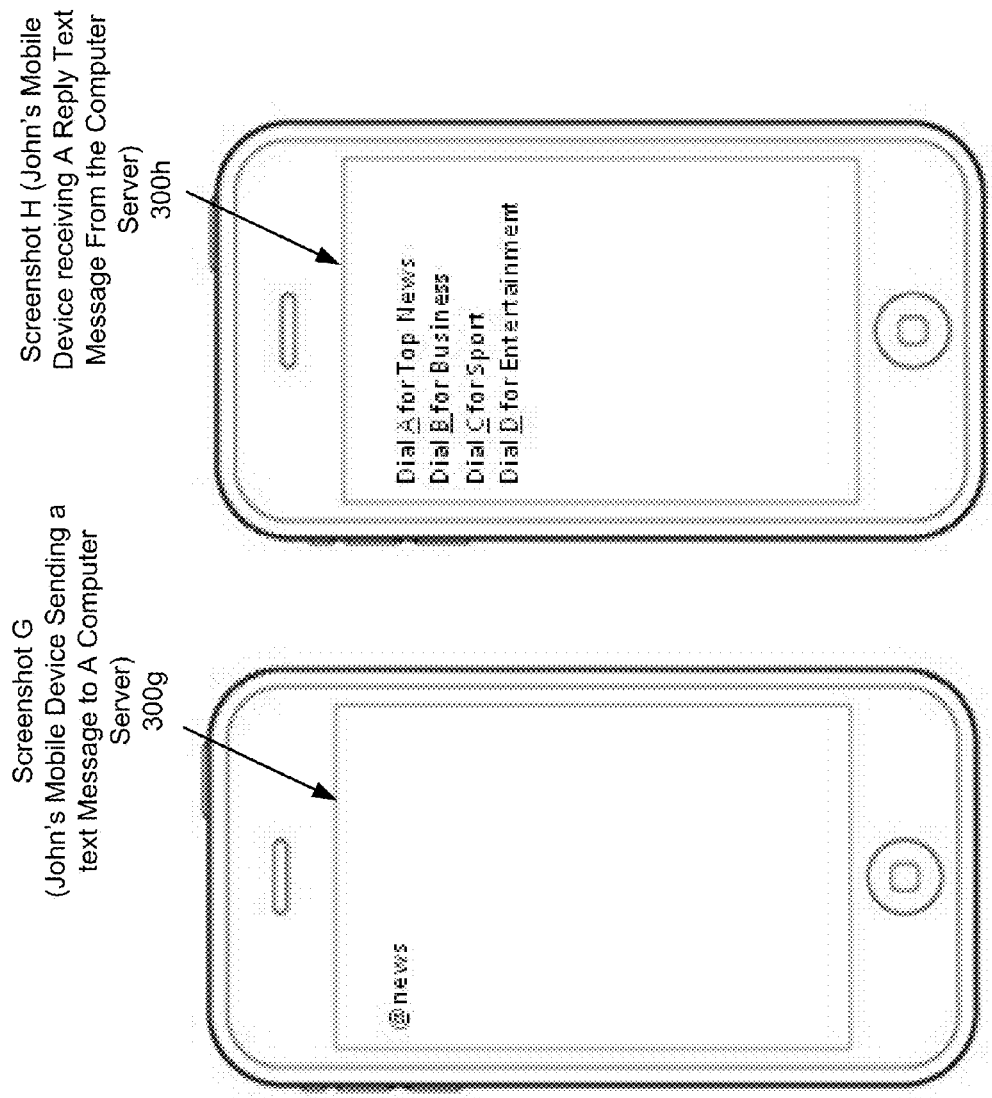

FIG. 3G shows screenshot G (300g) of a texter John's mobile device when John is composing a text message to be sent to a computer server for accessing news services. As shown, the screenshot G (300g) includes the composed text message displayed on John's mobile device that reads "@news," which is a command advertised by the computer server operator for any subscriber to use to access the computerized news services.

In response, FIG. 3H shows screenshot H (300h) of John's mobile device displaying the reply text message sent from the computer server in response to the text message "@news" sent by John. John's mobile device is installed with a software application executing the method depicted in FIG. 2B that has previously received four surrogate contact names "A", "B", "C", and "D" with corresponding surrogate contact phone numbers "800-123-1111", "800-123-1112", "800-123-1113", and "800-123-1114" from the computer server. Accordingly, the contact list in John's mobile device now includes four surrogate contact entries based on these surrogate contact names and surrogate contact phone numbers received from the computer server. As shown, the reply text message from the computer server is displayed on John's mobile device to show "Dial A for Top News," "Dial B for Business," "Dial C for Sport," and "Dial D for Entertainment" in an easy to read format. If John wishes to listen to business news, he may click the hypertext B in the displayed text message, which will cause his mobile device to place a call using the corresponding surrogate phone number "800-123-1112" stored in the contact list of his mobile device. Once the call is connected, the business news recording is played back for John.

In one or more embodiments, the four surrogate contact phone number calls the same computer server that is configured for sending the text message instruction as well as providing news recordings. In one or more embodiments, the four surrogate contact phone number are used to call a different computer server that is configured to provide news recordings and is different than the computer server that is configured to send text message instructions.

Given that four multi-digit phone numbers are represented as four single digit surrogate contact names in the text message, the size of the text message is efficiently used allowing future expansion of the selection menu to contain many more than four selections before reaching the limitation.

Figure 4:
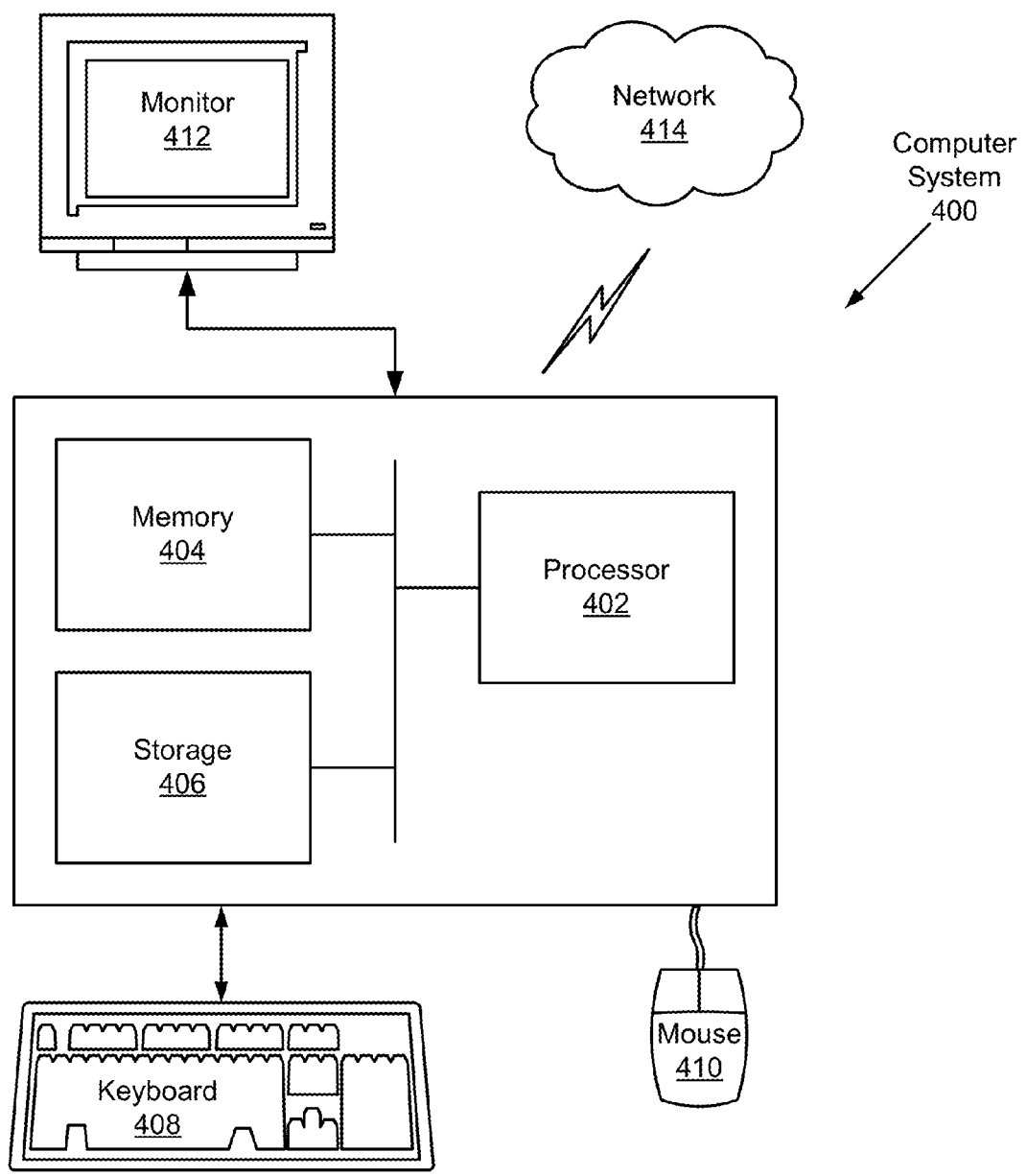
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (105). The computer system (400) may also include input means, such as a keyboard (408), or a mouse (410). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (105). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to initiate a phone call to a contact, comprising:
   receiving, from a computer server, a name and a phone number of the contact to be included in a contact list stored in a mobile device of a user, wherein the contact list comprises contact names and contact phone numbers of contacts of the user;
   generating a hyperlink in response to including the name and the phone number in the contact list, wherein the hyperlink links the name as a hypertext to the phone number in the contact list;
   sending, to the computer server and in response to generating the hyperlink, a confirmation indicating that the name and the phone number have been included in the contact list;
   analyzing, by a computer processor of the mobile device, a text message received by the mobile device to identify an attribute of the contact included in the text message, wherein the text message is received from the computer server in response to the computer server receiving the confirmation;
   modifying, by the computer processor and in response to identifying the attribute of the contact, the text message to generate a displayed text message comprising a modified attribute that is modified from the attribute of the contact;
   selecting one or more entries from the contact list stored in the mobile device by matching the attribute of the contact to one or more contact name candidates found in the one or more entries;
   identifying the phone number of the contact from the one or more entries, comprising:
      receiving a first input indicating the user clicking the modified attribute in response to viewing the displayed text message;
      displaying, on the mobile device and in response to receiving the first input, a selection menu comprising the one or more contact name candidates;
      receiving a second input indicating the user clicking one of the one or more contact name candidates in the selection menu to identify the contact, wherein the one of the one or more contact name candidates is displayed as the hypertext in the selection menu; and
      identifying the phone number using the hyperlink in response to the user clicking the hypertext displayed in the selection menu; and
   initiating, using the mobile device, the phone call to the contact based on the phone number and in response to receiving the second input.

2. The method of claim 1,
   wherein the first attribute comprises at least one selected from a group consisting of the name, the phone number, and a context of the text message describing the contact.

3. The method of claim 1,
   wherein the computer server comprises a module configured to receive the phone call as the contact.

4. A method to initiate a phone call to a contact, comprising:
   sending, from a computer server to a mobile device, a name and a phone number of the contact to be stored in a contact list of the mobile device, wherein the contact list comprises contact names and contact phone numbers of acquaintances of a user of the mobile device;
   receiving, by the computer server from the mobile device, a confirmation indicating that the name and the phone number is included in the contact list, wherein including in the contact list comprises generating a hyperlink that links the name as a hypertext to the phone number in the contact list; and
   sending, from the computer server and in response to receiving the confirmation, a text message comprising the name of the contact and instructing the user to initiate a phone call to the contact,
   wherein initiating the phone call comprises:
      analyzing, using a computer processor of the mobile device, the text message to identify the name included in the text message;
      selecting one or more entries from the contact list by matching the name to a portion of each of the one or more entries;
      identifying the phone number of the contact from the one or more entries, comprising:
         displaying, on the mobile device, a selection menu comprising the one or more contact name candidates, wherein one of the one or more contact name candidates is displayed as the hypertext in the selection menu;
      receiving an input indicating the user clicking the hypertext in response to viewing the selection menu; and
      initiating, using the mobile device based on the phone number and in response to receiving the input, the phone call to the contact.

5. A mobile device to initiate a phone call to a contact, comprising:
   a processor;
   a text message analyzer executing on the processor and configured to:
      analyze a text message received by the mobile device to identify an attribute of the contact included in the text message, wherein the text message is received from a computer server in response to the computer server receiving a confirmation message from the mobile device;
   a contact list analyzer executing on the processor and configured to:
      receive, from the computer server, a name and a phone number of the contact to be included in a contact list stored in the mobile device, wherein the contact list comprises contact names and contact phone numbers of contacts of a user of the mobile device;
      generate a hyperlink in response to including the name and the phone number in the contact list, wherein the hyperlink links the name as a hypertext to the phone number in the contact list;
      sending, to the computer server and in response to generating the hyperlink, the confirmation message indicating that the name and the phone number have been included in the contact list;
      select one or more entries from the contact list by matching the attribute of the contact to one or more contact name candidates found in the one or more entries; and
      identify the phone number of the contact from the one or more entries based on a first pre-determined criterion;
   a user module executing on the processor and configured to:
      generate a displayed text message comprising a modified attribute that is modified from the attribute of the contact;

receive a first input indicating the user clicking the modified attribute in response to viewing the displayed text message;

display, in response to receiving the first input, a selection menu comprising the one or more contact name candidates;

receive a second input indicating the user clicking one of the one or more contact name candidates in the selection menu to identify the contact, wherein the one of the one or more contact name candidates is displayed as the hypertext in the selection menu, wherein the phone number is identified by the contact list analyzer using the hyperlink in response to the user clicking the hypertext displayed in the selection menu; and initiate, based on the phone number and in response to receiving the second input, the phone call to the contact;

a display device configured to present the displayed text message and the selection menu to the user; and a repository configured to store the contact list.

6. The mobile device of claim 5, wherein the first attribute comprises at least one selected from a group consisting of the name, the phone number, and a context of the text message describing the contact, and wherein the repository is further configured to store the hyperlink.

7. A non-transitory computer readable medium storing instructions to initiate a phone call to a contact, the instructions when executed by a computer processor of a mobile device comprising functionality to:

receive, from a computer server, a name and a phone number of the contact to be included in a contact list stored in a mobile device of a user, wherein the contact list comprises contact names and contact phone numbers of contacts of the user;

generate a hyperlink in response to including the name and the phone number in the contact list, wherein the hyperlink links the name as a hypertext to the phone number in the contact list;

send, to the computer server and in response to generating the hyperlink, a confirmation indicating that the name and the phone number have been included in the contact list;

analyze a text message received by the mobile device to identify an attribute of the contact included in the text message, wherein the text message is received from the computer server in response to the computer server receiving the confirmation;

modify, in response to identifying the attribute of the contact, the text message to generate a displayed text message comprising a modified attribute that is modified from the attribute of the contact;

select one or more entries from the contact list stored in the mobile device by matching the attribute of the contact to one or more contact name candidates found in the one or more entries;

identify the phone number of the contact from the one or more entries, comprising:

receiving a first input indicating the user clicking the modified attribute in response to viewing the displayed text message;

displaying, on the mobile device and in response to receiving the first input, a selection menu comprising the one or more contact name candidates;

receiving a second input indicating the user clicking one of the one or more contact name candidates in the selection menu to identify the contact, wherein the one of the one or more contact name candidates is displayed as the hypertext in the selection menu; and identifying the phone number using the hyperlink in response to the user clicking the hypertext displayed in the selection menu;

and initiate, using the mobile device, the phone call to the contact based on the phone number and in response to receiving the second input.

8. The non-transitory computer readable medium of claim 7, wherein the first attribute comprises at least one selected from a group consisting of the name, the phone number, and a context of the text message describing the contact.

9. A non-transitory computer readable medium storing instructions to initiate a phone call to a contact, the instructions when executed by a processor of a computer server comprising functionality to:

send, to a mobile device, a name and a phone number of the contact to be stored in a contact list of the mobile device, wherein the contact list comprises contact names and contact phone numbers of acquaintances of a user of the mobile device;

receive, from the mobile device, a confirmation indicating that the name and the phone number is included in the contact list, wherein including in the contact list comprises generating a hyperlink that links the name as a hypertext to the phone number in the contact list; and send, in response to receiving the confirmation, a text message comprising the name of the contact and instructing the user to initiate a phone call to the contact, wherein initiating the phone call comprises:

analyzing the text message to identify the name included in the text message;

selecting one or more entries from the contact list by matching the name to a portion of each of the one or more entries;

identifying the phone number of the contact from the one or more entries, comprising:

displaying, on the mobile device, a selection menu comprising the one or more contact name candidates, wherein one of the one or more contact name candidates is displayed as the hypertext in the selection menu;

receiving an input indicating the user clicking the hypertext in response to viewing the selection menu; and initiating, using the mobile device based on the phone number and in response to receiving the input, the phone call to the contact.

* * * * *